Dec. 17, 1957 W. BROWN 2,816,634
COMBINED CHANGE-SPEED GEAR AND BRAKE
HUBS FOR BICYCLE WHEELS
Filed Feb. 5, 1953 3 Sheets-Sheet 1

INVENTOR
WILLIAM BROWN
BY
ATTORNEY

INVENTOR
WILLIAM BROWN

BY [signature]

ATTORNEY

Dec. 17, 1957 W. BROWN 2,816,634
COMBINED CHANGE-SPEED GEAR AND BRAKE
HUBS FOR BICYCLE WHEELS
Filed Feb. 5, 1953 3 Sheets-Sheet 3

INVENTOR
WILLIAM BROWN

BY

ATTORNEY

United States Patent Office 2,816,634
Patented Dec. 17, 1957

2,816,634

COMBINED CHANGE-SPEED GEAR AND BRAKE HUBS FOR BICYCLE WHEELS

William Brown, Nottingham, England, assignor to Sturmey-Archer Gears Limited

Application February 5, 1953, Serial No. 335,316

Claims priority, application Great Britain August 2, 1952

6 Claims. (Cl. 192—4)

This invention relates to a combined change-speed gear and brake hub, for the rear wheel of a bicycle of the kind embodying epicyclic gearing with free-wheel or uni-directional type forward drive coupling between the gear and the wheel hub and a brake having brake-actuating mechanism adapted to be actuated by pedalling backwards.

There are many known forms of epicyclic change-speed gear hubs for bicycles and various types of brake have been combined with them to make up several forms of so-called "coaster" hubs in which the brake is applied by "back-pedalling," i. e. by applying a controlled pressure to the pedals in a sense contrary to that for propelling the bicycle in a forward direction. With such geared coaster hubs it is desirable, and in fact almost essential, to be able to wheel the bicycle backwards without applying the brake, and many constructions are known and in use which achieve this object.

One problem still remains, namely that with a geared coaster hub of the kind referred to, locking of the wheel by the use of the pedals to apply the brake may synchronise with the engagement with the wheel hub of a forward driving pawl of the gear, thereby preventing forward releasing movement, relative to the wheel, of the brake-actuating mechanism of the gear. If the wheel has been very tightly locked in this manner the brake probably could not be released at all by forward pressure on the pedals, and in any case, considerable force, such as could cause serious damage to the gear, would have to be applied to the pedals, or wheel, or both, before the brake could be released.

It is the object of this invention to provide an improved coupling mechanism between the gear mechanism and the brake mechanism of such a hub so as to provide a forward drive through the gears or a rearward drive to the brake-actuating mechanism and at the same time to provide an efficient method of allowing the bicycle to be wheeled backwards without applying the brake, and in particular to overcome the aforesaid interference with the release of the brake by the forward driving coupling.

According to the invention a combined change-speed gear and brake hub of the kind referred to is characterised by the provision of lost-motion coupling means between the gear and the part of the forward drive coupling to the hub carried thereby, whereby forward release movement of the brake-actuating mechanism relative to the hub is possible in spite of engagement of such forward drive coupling.

According to a preferred embodiment of the invention a combined change-speed gear and brake hub comprises in combination an epicyclic gear train with sun, planet, planet carrier and annulus members having pawl and ratchet connection between the planet carrier and an output member and between the annulus and an output member with selective coupling between an input member and either the planet carrier or annulus members, means being provided for disconnecting the pawl and ratchet connection between the annulus and the output member for one position of the selective coupling between the input member and the annulus, with a brake mechanism operating on the inner periphery of one of the output members, characterised in that one member of the brake-actuating mechanism is coupled to the planet carrier with little or no lost motion, and in that the planet carrier pawl is carried by a member coupled with lost motion to the planet carrier or to the aforesaid member of the brake-actuating mechanism and without lost motion to another member of the brake-actuating mechanism necessarily rotatably movable relative to the first member of the brake-actuating mechanism for applying or releasing the brake and in that the annulus pawl is carried by a member coupled with lost motion to the annulus, whereby rotation of the planet carrier in the forward direction is possible so as to release the brake after engagement of either pawl.

The preferred embodiment of a combined change-speed gear and brake hub aforesaid may be further characterised in that the brake mechanism consists of a split brake ring with internal conical surfaces held between two conical-edged plates, one of which is fixed against rotation and is provided with a projection to engage in a slot in the brake ring the other being provided with means to urge it towards the fixed plate so as to expand the split ring into contact with the output member, the movable conical plate being attached in a rotational sense without lost motion to the planet carrier pawl ring but slidable axially thereto.

The combined change-speed gear and brake hub further characterised as aforesaid may be still further characterised in that the means provided for moving the conical plate towards the fixed plate is the provision of opposing ramps with interposed balls, the first ramp being formed on the axially moving conical plate and the second ramp being formed on a member which is attached without lost motion to the planet carrier. Alternatively, the balls and ramps could be replaced by coacting face cams with the same result.

Referring to the accompanying drawings.

Figure 4:
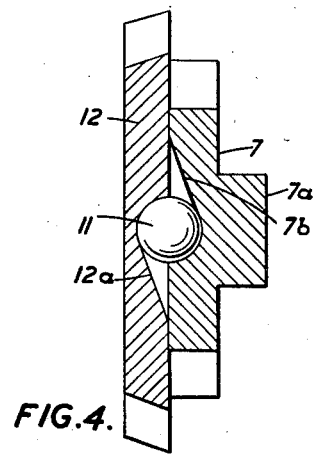
Fig. 4 is a detail section of one form of the brake application means embodied in Fig. 1 and taken on the chord through the centre of the ball and normal to the radius of the hub through such ball.
Figure 5:
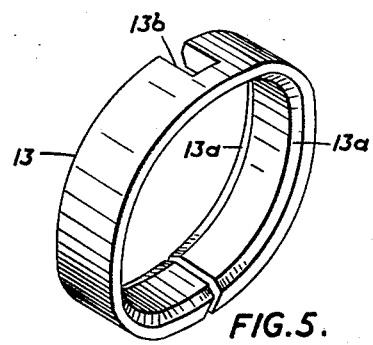
Fig. 5 is a perspective view of the brake ring shown in Fig. 1.

As shown in the drawings a coaster hub according to the invention comprises a spindle 1 on which is formed, or fixed, a sun pinion 2. Meshing with said pinion are planet pinions 3 carried on pins 4 in a planet carrier 5 which has an extension 5a on one end which is provided with slots 5b. The pins have extensions 4a which as explained later provide coupling means for coupling a driving member direct to the planet carrier. Abutting on the sun pinion 2 is a thrust ring 6 against which is a cam member 7 provided with dogs 7a which engage with the slots 5b of the planet carrier 5. Surrounding the cam member 7 is a grooved pawl ring 8 provided with internal splines 8a carrying pawls 9 on pins 10 (see Fig. 2) located at clearance flats 8c. The dimensions of the dogs 7a and the splines 8a are so selected as to give any required degree of lost movement in a rotational sense between the pawl ring 8 and cam member 7, and therefore with the planet carrier 5, these latter two being connected with little or no lost motion by the slots 5b and the dogs 7a. Formed in the cam member 7 are ramps, preferably three, shown at 7b (Fig. 4) carrying balls 11. A conical-edged plate 12, with co-acting complementary ramps 12a, lies adjacent to the cam member 7 and in this plate 12 are slots 12b (see Fig. 1) which receive projecting dogs 8b formed on the pawl ring 8 so that although the plate 12 can move axially away from the pawl ring 8 it is constrained to follow it in a rotational sense. A split internal-expanding brake ring 13 (see Fig. 5) of suitable material such as Phosphor bronze surrounds the plate 12 and is provided with opposing conical inner surfaces, one of which is complementary to the conical periphery of the cam plate 12 and the other complementary to a further conical-edged plate 14 which also lies within the brake ring. This plate 14 has a central hole by which it is located on the axle 1 and is provided with an abutment lug 14a which engages with a slot 13b in the ring 13 so as to prevent relative rotation while permitting relative axial movement. A bearing member 15, also located on the axle 1, has projecting lugs 15a complementary to notches 14b in the central hole of the plate 14 and also on its other side has further lugs 15b complementary to notches 16a in a torque arm 16, locknuts 17 being provided for bearing adjustment. The means for attaching the torque arm to the cycle frame is not shown and can be of any suitable known construction. A further bearing member 18 is carried by balls 19 on the bearing member 15 and is also splined or keyed into the hub shell 20 at 18a. Slots 18b (see Figs. 1 and 2) in the inner end of the member 18 form the co-acting ratchet for the pawls 9 and the inner periphery of the member 8 forms the brake drum for the internal-expanding brake ring 13.

Figure 1:
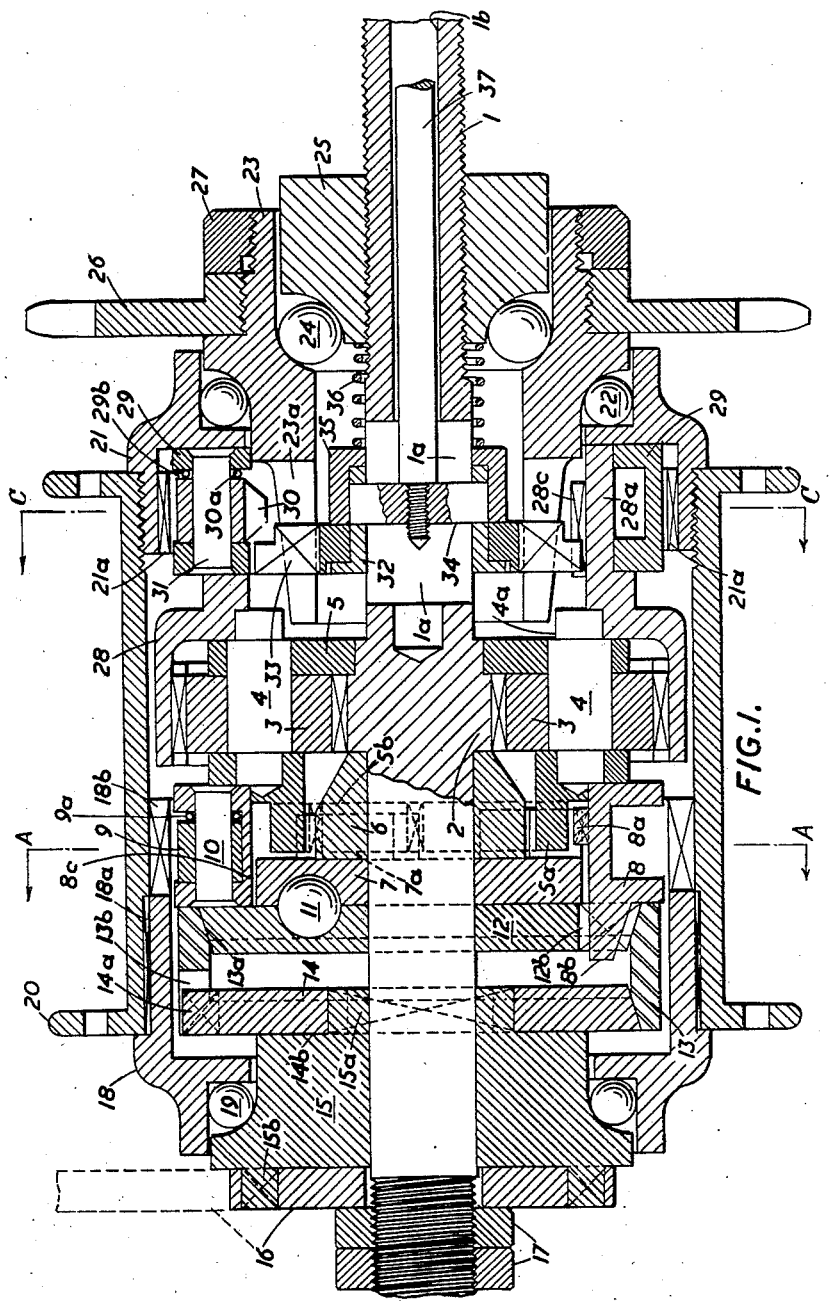
Fig. 1 shows a longitudinal section of one example of a coaster hub made in accordance with the present invention, the section being taken on line B—O—B of Fig. 2 and D—O—D of Fig. 3.

Into the other end of the hub shell 20 is screwed a further bearing member 21 having internal ratchet teeth 21a. This member is carried on balls 22 on an input member 23, which in turn is carried on balls 24 on a further bearing member 25, the latter being screwed to the axle 1. Mounted on the input member 23 is a sprocket 26 secured by a lock ring 27. The gear train is completed by an annulus 28 which meshes with the pinions 3. An extension 28a on the annulus carries an internally grooved pawl ring 29 (see lower half of Fig. 1) and is provided with slots 28b (see Fig. 3) to receive internal projections 29a of the pawl ring 29. The bore of the annulus 28 is further provided with internal driving dogs or splines 28c. The dimensions of the pawl ring projections 29a and the annulus slots 28b are so selected as to give the required degree of lost motion in a rotational sense between the pawl ring 29 and the annulus 28. Pawls 30 are carried on pins 31 in the pawl ring 29, slots 29b being provided to allow one end of the pawls 30 to project outwardly through the ring to engage with the ratchet teeth 21a. Slidably mounted on the axle 1 is a sleeve 32 on which is journaled a selector dog member 33 which can move axially in slots 23a of the input member 23, its movement being controlled by a pin 34 in a slot 1a of the axle 1. A thrust ring 35 and spring 36 keep the dog member 33 to the left unless constrained to move to the right by operation of a rod 37 which is screwed to the pin 34 and lies within a hole 1b in the axle 1. The selector dog member 33 is engageable with the extensions 4a of the planet carrier pins 4, or, as shown in Fig. 1 with the splines 28c, or by further movement to the right, and while still engaged with the splines 28c, it can engage the inner ends of the pawls 30 to trip their outer ends from engagement with the ratchets 21a. The pawls 9 and 30 are normally urged into their outward or engaged positions by springs 9a and 30a shown at their right hand sides.

The actual gear operation is as follows:

When the selector dog member 33 engages the pins 4 an increase gear is obtained, the drive to the shell being from the driving member 23, 23a through 33 to the pin extensions 4a, through the gearing to the annulus 28 to the pawl ring 29 through 29a and thence via pawls 30 to the member 21. Since the annulus rotates faster than the planet carrier the ratchet teeth 18b of the other member 18 attached to the shell 20 will overrun the pawls 9 which are associated with the planet carrier.

When the dog member 33 is in a mid-way position engaging the internal splines 28c of the annulus as shown in Fig. 1 a direct drive is obtained since the selector dog member 33 through splines 28c now drives direct to the annulus 28 and thence as before through the pawls 30, the gear train being cut out of use and only idling.

Further movement to the right of the dog member 33 leaves said member still in engagement with the splines 28c but the dog member 33 will now lie under the pawls 30 and by tipping their other ends out of engagement with the ratchet teeth 21a will render them inoperative so that the pawls 9 associated with the ratchet teeth 18b will take up the drive so giving a reduction gear, the drive being from 23, through 33 direct to the annulus 28 and thence through the gear and pawls 9 to the hub end 18. This is quite a well known method of selection using alternative sets of output pawls.

Figure 2:
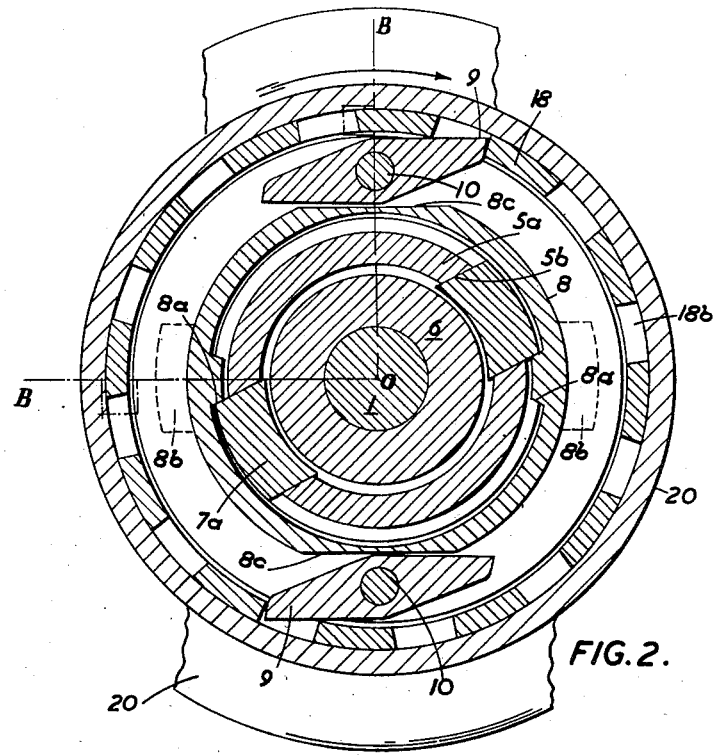
Fig. 2 is a sectional end view on the line A—A of Fig. 1.
Figure 3:
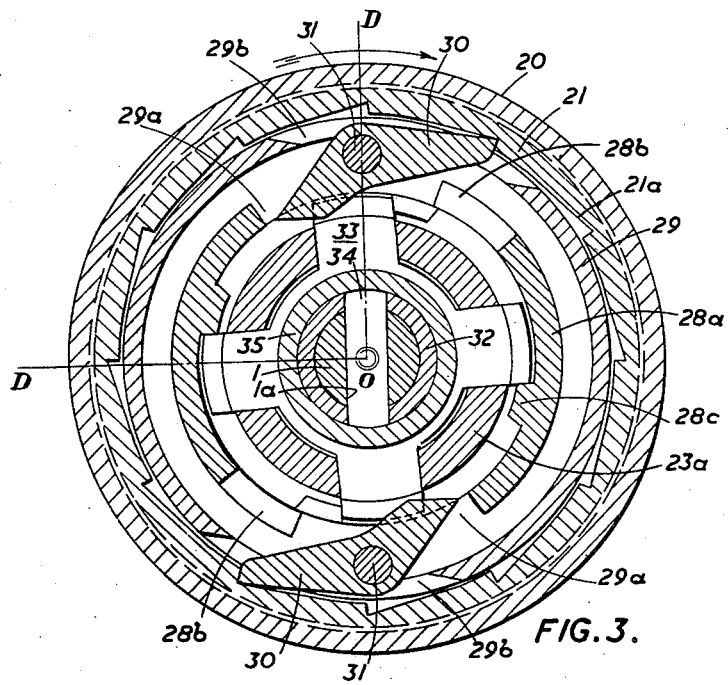
Fig. 3 is a sectional end view on the line C—C of Fig. 1.

The brake operation is as follows:

Any forward movement of the hub shell 20 (with its ends 18 and 21) relative to the pawl rings 8 and 29 as indicated by the arrow at the top of Figs. 2 and 3, either by allowing the bicycle to free-wheel or by pedalling backwards, will absorb, by the frictional drag of the pawls 30 on the ratchet 21a, the lost motion shown at its maximum in Fig. 3 between pawl ring 29 and annulus 28. When forward drive is being transmitted through the pawls 9 and ratchet formed by the notches 18b (i. e. with the selector dog member 33 underlying the pawls 30) the lugs 7a engage the lugs 8a in the position shown in Fig. 2 and the parts 7 and 12 are relatively in the position shown in Fig. 4 with the ball 11 in the deepest part of each ramp. When free-wheeling or when driving with the dog member 33 in either of the other two possible positions, the ratchet formed by the notches 18b overruns the pawls and the frictional drag of the pawls 9 is also sufficient to cause the pawl ring 8 to turn the plate 12 forwardly, taking up just so much of the lost motion between the lugs 8a and the lugs 7a as is necessary for the balls 11 on the ramps 12a and 7b to produce axial movement of the plate 12 bringing it into initial contact with the inner conical face 13a of the brake ring 13. By virtue of such "take up" the planet carrier 5 has therefore at least such amount of lost motion always available before forward drive can be effected by pawls 9. Any further backwards rotation of the pedals will rotate the planet carrier 5 of the gear unit in the same reverse direction sense, and with it the cam member 7, so that there is no lost movement, backward, of the pedals before braking pressure can be applied. The frictional grip of the stationary conical face 13a on the plate 12 prevents backwards rotation of the plate 12 so that the balls 11 on the ramps 12a and 7b produce axial movement of the plate 12 towards plate 14. The conical edges of these two plates, in conjunction with the internal conical faces 13a, force open the brake ring 13 into contact with the inner bore of the member 18 so as to apply the brake in proportion to the backward pressure applied to the pedals. The total degree of lost motion between the lugs 8a of pawl ring 8 and the planet carrier 5 through the lugs 7a of the cam member 7 is so proportioned that the balls do not ride past the ends of the ramps. It should be noted that co-acting face cams could be used instead of the balls and ramps, the lost motion being such that the face cams would not override each other. Releasing the pressure on the pedals, or pedalling forward, allows the cam member 7 to rotate forwardly or rotates it forwardly, so releasing the brake, such cam member 7 and the planet carrier 5 being able to move, or be moved, such distance forwardly before the splines 8a engage 7a as shown in Fig. 2 or before 28 engages 29a when the pawls 10 and 30 could by their engagement with their ratchets, prevent such relative forward rotation of the parts 5 and 7.

If the bicycle be wheeled backwards the pawls 9 will be picked up by the ratchet teeth 18b since in an epicyclic gear as shown the planet carrier always rotates slower than the annulus. The plate 12 will then be carried backwards at the same speed as the hub shell and since the cam member 7 drags behind until 8a engages 7a when it will also be carried backwards, at the same speed, the brake will not be applied. Should the pawls 30 engage the ratchet teeth 21a before the pawls 9 engage with the ratchet teeth 18b, due to the random phasing of the various parts, the lost motion between pawl ring 29 and annulus 28 allows sufficient relative movement to ensure that the pawls 9 turn the ring 8 and plate 12 backwards before any effective backwards motion can be imparted to the cam member 7 to apply the brake. Further, if the wheel be completely locked by a vigorous application of the brake, the lost motion in the two pawl rings is sufficient to release the brake even though either or both sets of pawls engage with their respective ratchets.

It will be seen, therefore, that at all times the brake is available on pedalling backwards, that the bicycle can be wheeled backwards without applying the brake and that forward rotation of the gear to release the brake cannot be prevented by the engagement of either set of output coupling pawls.

Lost motion between the planet carrier 5 and the lugs 7a must be kept as little as possible because any added lost motion merely delays the application of the brake.

I claim:

1. In a variable speed transmission and brake for a bicycle wheel hub, a stationary axle, a driving member journalled on one end of the axle, an anchor member mounted on the other end of the axle, a wheel hub rotatably mounted on the said driving and anchor members, planetary gearing located within the wheel hub, said gearing consisting of a plurality of drivingly related parts, one of said parts being coupled to the driving member and two of said parts being selectively coupled to the hub, coupling members for selectively coupling either of the two last-mentioned parts to the hub, brake means non-rotatably coupled to the anchor member and frictionally engageable with the hub, means responsive to reverse rotation of another of said parts for engaging the brake means, a ring located between the wheel hub and each of said two parts of the planetary gearing, the said coupling members being operably located between the said ring and the wheel hub, complementary dog clutch means on said ring and one of the parts of the planetary gearing permitting a limited degree of turning movement or lost motion at said dog clutch means, so that after backward rotation of the reverse rotatable part of the planetary gearing for applying braking pressure, forward rotation of the said two parts of the planetary gearing, relative to the wheel hub is permitted sufficient for release of the braking pressure between the brake member and the wheel hub in spite of engagement of the clutch means.

2. In a variable speed transmission as provided for in claim 1, characterized in that the brake means includes a split, internally-expanding ring and complementary braking surface within the wheel hub.

3. In a variable speed transmission for brake for a bicycle wheel hub, a stationary axle, a driving member journalled on one end of the axle, an anchor member mounted on the other end of the axle, a wheel hub rotatably mounted on said driving and anchor members, planetary gearing within the wheel hub and establishing a drive between the driving member and wheel hub, said gearing consisting of a plurality of drivingly related parts, one of said parts being coupled to the driving member and two of said parts being selectively coupled to the hub, coupling means for selectively coupling either of the last-mentioned parts to the hub, brake means non-rotatably coupled to the anchor member and frictionally engageable with the hub, means operative upon backward rotation of one of the parts of the planetary gearing to cause braking pressure to be applied between the brake means and the hub, a ring located between one of the parts of the planetary gearing and a part of the wheel hub, said coupling means including pawls carried by the ring, ratchet teeth in the wheel hub engaged by the pawls, and means by which after backward rotation of the reverse rotatable part of the planetary gearing for applying braking pressure, forward rotation of the said two parts of the planetary gearing relative to the wheel hub is permitted sufficient for the release of the braking pressure between the wheel hub in spite of the engagement of the coupling means.

4. In a variable speed transmission gear and brake according to claim 3, wherein the brake means includes a split expansible ring and the brake operating means comprises a cone and conical end faces in the brake ring, one of the parts of the planetary gearing comprising a planet carrier, and face cam means between the cone and said planet carrier adapted, on reverse rotation of said planet carrier relative to said cone, to cause the cone to move axially toward the brake ring and expand the same into frictional contact with the complementary braking surface within the wheel hub.

5. A combined change-gear and brake hub for the rear wheel of a bicycle comprising, a wheel hub, a drive member driven by a cycle pedal, epicyclic gearing contained within the hub, said gearing consisting of a plurality of drivingly related parts, one of said parts being coupled to the drive member and two of said parts being selectively coupled to the hub, said gearing also including a forward drive coupling between either of the lastmentioned two parts and the wheel hub, a brake within the hub and including a brake-actuating member, means for operating the said brake-actuating member from the gearing in a manner to cause application of the brake by back-pedaling on the cycle pedal, said means including a lost-motion creating means operative between operating means and the wheel hub to permit of forward release movement of the brake-actuating member in spite of drive engagement of operating means with the wheel hub.

6. In a variable speed transmission and brake for a bicycle hub, a stationary axle, a driving member journalled on one end of the axle, an anchor member mounted on the other end of the axle, a wheel hub rotatably mounted on said driving and anchor members, planetary gearing contained within the wheel hub and establishing a driving connection between the driving member and hub, said gearing consisting of a plurality of drivingly related parts, one of said parts being coupled to the driving member and two of said parts being selectively coupled to the hub, coupling means by which the selective coupling between either of the two last-mentioned parts and the hub is effected, said coupling means including a unidirectional clutch means for coupling parts of the gearing to the wheel hub to cause driving of the hub thereby, brake means non-rotatably coupled to the anchor member and frictionally engageable with the hub upon backward rotation of a reverse rotatable part of the planetary gearing, means for causing braking pressure of the brake means to be applied against the hub upon such backward movement of said reverse rotatable part of the planetary gearing, a plate located between a part coupled to the wheel hub and one of the parts of the planetary gearing, said uni-directional clutch means being operably positioned between the plate and the said one part of the planetary gearing, and complementary dog clutch means operative upon the plate and on said gearing part to permit of a limited degree of relative turning of the plate so that after backward rotation of the reverse rotatable part of the planetary gearing for moving the brake means to apply braking pressure, forward movement of the said two parts of the planetary gearing relatively to the wheel hub is permitted sufficient for the release of the braking pressure between the brake means and the wheel hub in spite of the engagement of the unidirectional clutch means.

References Cited in the file of this patent

UNITED STATES PATENTS

| | | |
|---|---|---|
| 1,277,070 | Harrison | Aug. 27, 1918 |
| 2,180,527 | Jones | Nov. 21, 1939 |

FOREIGN PATENTS

| | | |
|---|---|---|
| 124,279 | Great Britain | Mar. 21, 1919 |
| 644,179 | Great Britain | Oct. 4, 1950 |